(12) United States Patent
Kim

(10) Patent No.: US 9,057,414 B2
(45) Date of Patent: Jun. 16, 2015

(54) TRANSMISSION MOUNTING UNIT FOR VEHICLE

(71) Applicants: Hyundai Motor Company, Seoul (KR); Kia Motors Corporation, Seoul (KR)

(72) Inventor: Hyo Seok Kim, Gyeonggi-Do (KR)

(73) Assignees: Hundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/044,257

(22) Filed: Oct. 2, 2013

(65) Prior Publication Data

US 2014/0103187 A1   Apr. 17, 2014

(30) Foreign Application Priority Data

Oct. 16, 2012   (KR) .................. 10-2012-0114981

(51) Int. Cl.
F16F 1/38   (2006.01)

(52) U.S. Cl.
CPC .................. *F16F 1/38* (2013.01); *F16F 1/3828* (2013.01)

(58) Field of Classification Search
CPC ....... F16F 13/1409; F16F 13/14; F16F 9/362; F16F 1/38
USPC .................. 248/638, 560, 562, 636, 637; 267/140.12, 219, 141.2, 140.13, 293, 267/122, 141.6, 140.11
See application file for complete search history.

(56) References Cited

U.S. PATENT DOCUMENTS

| 4,872,650 | A | * | 10/1989 | Tabata et al. | ............. 267/140.12 |
| 4,909,489 | A | * | 3/1990 | Doi | .......................... 267/140.12 |
| 5,129,479 | A | * | 7/1992 | Fujii et al. | ..................... 180/297 |
| 5,286,011 | A | * | 2/1994 | Strand | ...................... 267/140.12 |
| 5,344,126 | A | * | 9/1994 | Ishiyama | ................ 267/140.12 |
| 5,788,209 | A | * | 8/1998 | Dandre et al. | ................ 267/219 |
| 5,992,816 | A | * | 11/1999 | Yoshida et al. | ............... 248/638 |
| 6,557,838 | B2 | * | 5/2003 | Wirges | ..................... 267/140.12 |
| 6,698,731 | B2 | * | 3/2004 | Thornhill | ................ 267/140.12 |
| 7,575,087 | B2 | * | 8/2009 | Kim | ............................. 180/299 |
| 8,016,067 | B2 | * | 9/2011 | Horgas | .......................... 180/299 |
| 8,777,192 | B2 | * | 7/2014 | Kim et al. | ................ 267/140.12 |
| 2006/0151929 | A1 | * | 7/2006 | Franck et al. | ................. 267/293 |
| 2007/0131469 | A1 | * | 6/2007 | Kim | ............................. 180/293 |
| 2011/0024960 | A1 | * | 2/2011 | Bradshaw et al. | ....... 267/140.13 |
| 2013/0043370 | A1 | * | 2/2013 | Kim | ............................. 248/638 |
| 2013/0313399 | A1 | * | 11/2013 | Tsutsumi et al. | ............. 248/638 |

* cited by examiner

FOREIGN PATENT DOCUMENTS

| JP | 2001-304337 | 10/2001 |
| KR | 20-0238878 | 7/2001 |
| KR | 10-2011-0077668 | 7/2011 |

*Primary Examiner* — Nkeisha Smith
(74) *Attorney, Agent, or Firm* — Mintz Levin Cohn Ferris Glovsky and Popeo, P.C.; Peter F. Corless

(57) ABSTRACT

The transmission mounting unit for a vehicle includes a mounting bracket in which a cylindrical mounting unit is formed, mounting ends fixed to a vehicle body that are integrally formed on both sides of the mounting unit, and a bush unit inserted into the mounting unit of the mounting bracket. The bush unit has a first outer pipe that forms an outer shell to be inserted into the mounting unit, a first insulator bonded to an internal circumference of the first outer pipe and integrated with a stopper protruding from the first through hole, a second outer pipe inserted into the first outer pipe, an inner core disposed in a center of the second outer pipe, and a second insulator having an external circumference bonded to an internal circumference of the second outer pipe while surrounding an external circumference of the inner core.

9 Claims, 5 Drawing Sheets

TRANSMISSION MOUNTING UNIT FOR VEHICLE

CROSS-REFERENCE TO RELATED APPLICATION

This application claims under 35 U.S.C. §119(a) priority to and the benefit of Korean Patent Application N 10-2012-0114981 filed in the Korean Intellectual Property Office on Oct. 16, 2012, the entire contents of which are incorporated herein by reference.

BACKGROUND (a) Field of the Invention

The present invention relates to a transmission mounting unit for a vehicle. More particularly, the present invention relates to a transmission mounting unit for a vehicle for connecting a vehicle body and a transmission to efficiently attenuate a vibration generated by the transmission.

(b) Description of the Related Art

In general, an engine vibrates due to periodical changes in a central position caused by up and down motions of a piston and a connecting rod and a rotary motion of a crank shaft, an inertial force of the up and down motions of the piston and the connecting rod, and a torque of the crank shaft.

A transmission connected to the engine structurally always receives a vibration so that a torque of the engine in accordance with a driving state of a vehicle is increased or reduced.

Therefore, when the transmission is mounted in a vehicle body, it is necessary to devise an appropriate vibration insulating unit so as to improve a ride comfort of a passenger.

The engine and the transmission are referred to as power trains, and are supported by and mounted in the vehicle body by an engine mounting unit and a transmission mounting unit, respectively.

In a conventional art, insulators for insulating a vibration are applied to the engine mounting unit and the transmission mounting unit, respectively. However, it is difficult to appropriately absorb a complex vibration that appears in a wide frequency band only by use of the insulators.

To be specific, there are limitations on reducing dynamic characteristics of the engine and the transmission in an idle region only by use of the insulators. When a loss coefficient is reduced to reduce the dynamic characteristics, driving performance of a vehicle may be deteriorated.

In order to address such a drawback, a cone fluid encapsulation mounting unit that effectively absorbs a vibration through an operation fluid filled therein is used as the conventional engine mounting unit. However, due to space restraints, it is difficult to use the cone fluid encapsulation mounting unit as the transmission mounting unit. On the other hand, when a hydro bush is applied to the transmission mounting unit, static loads of the power trains are operated so that an excessive gap is formed between a top of a core and an outer pipe. Therefore, a ride comfort is deteriorated and durability may be deteriorated.

Therefore, it may be desirable to provide a method of forming a gap on the insulator between the core and the outer pipe and bonding an additional stopper formed of a rubber material through the gap to reduce displacements of the insulators, to increase durability, and to control a displacement of the transmission.

However, when the additional stopper is provided, constituent elements may be increased, an assembly process may be complicated, and manufacturing cost may be increased. In addition, as the additional stopper is bonded through an adhesive, the stopper is vulnerable to heat and contamination and may be separated from the insulators. Therefore, noise, vibration, and harshness (NVH) performance and durability of a vehicle may be deteriorated, and a vehicle dependability study (VDS) index may be reduced.

The above information disclosed in this Background section is only for enhancement of understanding of the background of the invention and therefore it may contain information that does not form the prior art that is already known in this country to a person of ordinary skill in the art.

SUMMARY

Therefore, in order to solve the above problem, an object of the present invention is to provide a transmission mounting unit for a vehicle in which a vehicle body and a transmission are connected by double outer pipes and an integral stopper so that it is possible to efficiently attenuate a vibration generated by the transmission and to improve durability and a commercial value.

In addition, another object of the present invention is to provide a transmission mounting unit for a vehicle in which a bonding process required when a conventional additional stopper is mounted is removed so that processes are simplified, and it is possible to reduce cost and to improve an assembly performance and productivity.

According to an exemplary embodiment of the present invention, there is provided transmission mounting unit for a vehicle, including a mounting bracket formed with a cylindrical mounting unit in a center of the mounting bracket, and mounting ends fixed to a vehicle body integrally formed on both ides of the mounting unit, and a bush unit inserted into the mounting unit of the mounting bracket. The bush unit may include a first outer pipe that forms an outer shell to be inserted into the mounting unit and having a first through hole on top of the first outer pipe, a first insulator bonded to an internal circumference of the first outer pipe and integrated with a stopper protruding from the first through hole to the outside of the first outer pipe, a second outer pipe inserted into the first outer pipe with the first insulator interposed, an inner core disposed in a center of the second outer pipe, and a second insulator having an external circumference bonded to an internal circumference of the second outer pipe while surrounding an external circumference of the inner core and having a gap corresponding to the first through hole and separated from the internal circumference of the second outer pipe by a predetermined distance.

A second through hole may be integrally formed on a top of the second outer pipe to correspond to the first through hole.

The stopper may be inserted into the gap through the first through hole of the first outer pipe and the second through hole of the second outer pipe while contacting an internal circumference of the mounting unit when the bush unit is inserted into the mounting unit of the mounting bracket.

The stopper may be formed so that edges of a top surface are rounded.

The second insulator may have operation holes penetratingly formed on both sides around the inner core and may be connected to the gap.

According to an exemplary embodiment of the present invention, there is provided a transmission mounting unit for a vehicle, including a mounting bracket formed with a cylindrical mounting unit in a center of the mounting bracket, and mounting ends fixed to a vehicle body integrally formed on both sides of the mounting unit; and a bush unit inserted into the mounting unit of the mounting bracket. The bush unit may include an outer pipe that forms an outer shell to be inserted into the mounting unit and having a through hole on top of the outer pipe, an inner core disposed in a center of the outer pipe, an insulator having external circumference bonded to an internal circumference of the outer pipe while surrounding an external circumference of the inner core and having a gap corresponding to the through hole and separated from the internal circumference of the outer pipe by a predetermined distance, and a stopper integrally formed with the insulator, and protruded to the outside of the outer pipe through the through hole.

The stopper may be inserted into the gap through the through hole of the outer pipe while contacting an internal circumference of the mounting unit when the bush unit is inserted into the mounting unit of the mounting bracket.

The stopper may be formed so that edges of a top surface are rounded.

DETAILED DESCRIPTION OF THE EMBODIMENTS

Figure 1:
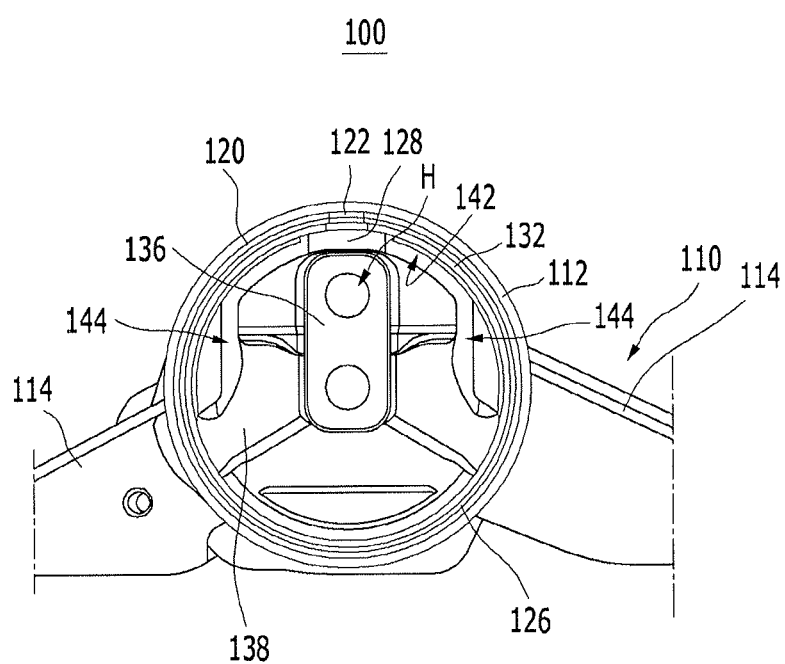
FIG. 1 is a front view of a transmission mounting unit for a vehicle according to an exemplary embodiment of the preset invention.

An exemplary embodiment of the present invention will hereinafter be described in detail with reference to the accompanying drawings.

It is understood that the term "vehicle" or "vehicular" or other similar e as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, as provided herein, environmentally-friendly vehicles include fuel cell vehicles, electric vehicles, plug-in electric vehicles, and hybrid vehicles, and the like, and preferably are equipped with one or more motors and an engine.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Since exemplary embodiments of the present invention and structures illustrated in the drawings are only exemplary and do not represent all of the spirit and scope of the present invention, it is to be understood that various equivalents and modifications that may replace the exemplary embodiments of the present invention and the structures illustrated in the drawings may exist.

Referring to FIGS. 1-5, in a vehicle transmission mounting unit 100 according to an exemplary embodiment of the present invention, a vehicle body and a transmission are connected by double outer pipes 122 and 132 and an integral stopper 128, and a large amplitude vibration generated by the transmission is efficiently controlled so that durability and a ride comfort may be improved and a commercial value may be improved.

In addition, in the vehicle transmission mounting unit 100 according to the exemplary embodiment of the present invention, a bonding process required in a conventional art when utilizing an additional stopper is removed so that processes are simplified. Therefore, it is possible to reduce cost and to improve an assembly performance and productivity.

As illustrated in FIG. 1, the vehicle transmission mounting unit 100 according to the exemplary embodiment of the present invention includes a mounting bracket 110 and a bush unit 120.

First, a cylindrical mounting unit 112 is formed in a center of the mounting bracket 110 to connect a transmission (not shown) and a vehicle body (not shown) in an engine compartment of a vehicle, and mounting ends 114 fixed to the vehicle body are integrally formed on both sides of the mounting unit 112.

The mounting bracket 110 is connected to the transmission through the bush unit 120 inserted into the mounting unit 112, and the mounting ends 114 are fixed to the vehicle body to connect the non-illustrated vehicle body and transmission to each other.

Figure 2:
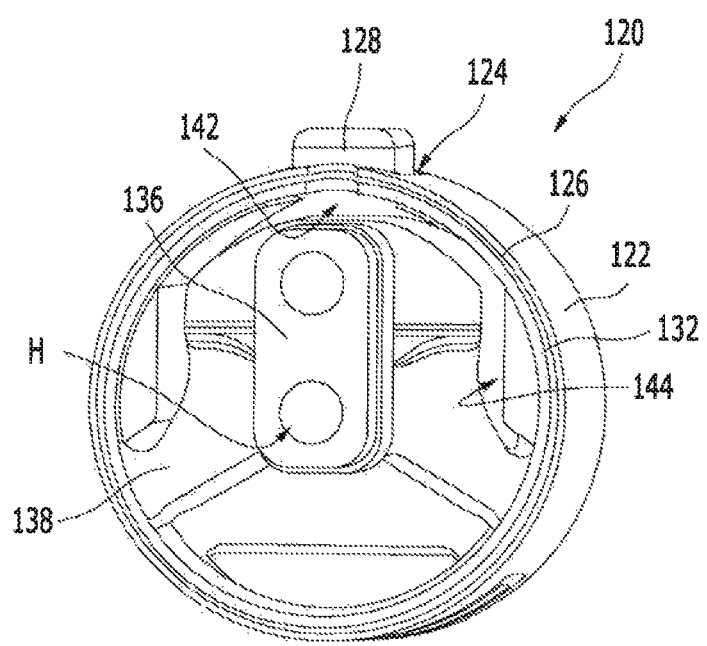
FIG. 2 is a perspective view of a bush unit applied to the transmission mounting unit of FIG. 1.

As illustrated in FIG. 2, the bush unit 120 includes a first outer pipe 122, a first insulator 126, a second outer pipe 132, an inner core 136, and a second insulator 138. First, the first outer pipe 122 forms an outer shell of the bush unit 120 to be inserted into the mounting unit 112 and a first through hole 124 is formed on the first outer pipe 122. Here, the first penetration hole 124 may be square.

Figure 3:
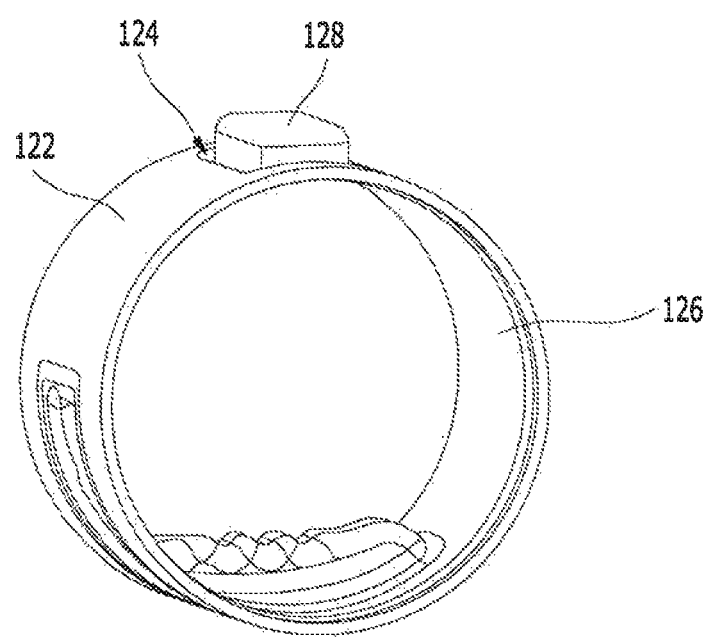
FIG. 3 is a view illustrating a state in which a first insulator is mounted in a first outer pipe applied to the bush unit of FIG. 2.

As shown in FIG. 3, the first insulator 126 is bonded to an internal circumference of the first outer pipe 122, and a stopper 128 that protrudes from the first through hole 124 to the outside of the first outer pipe 122 is integrally formed in the first insulator 126.

Figure 4:
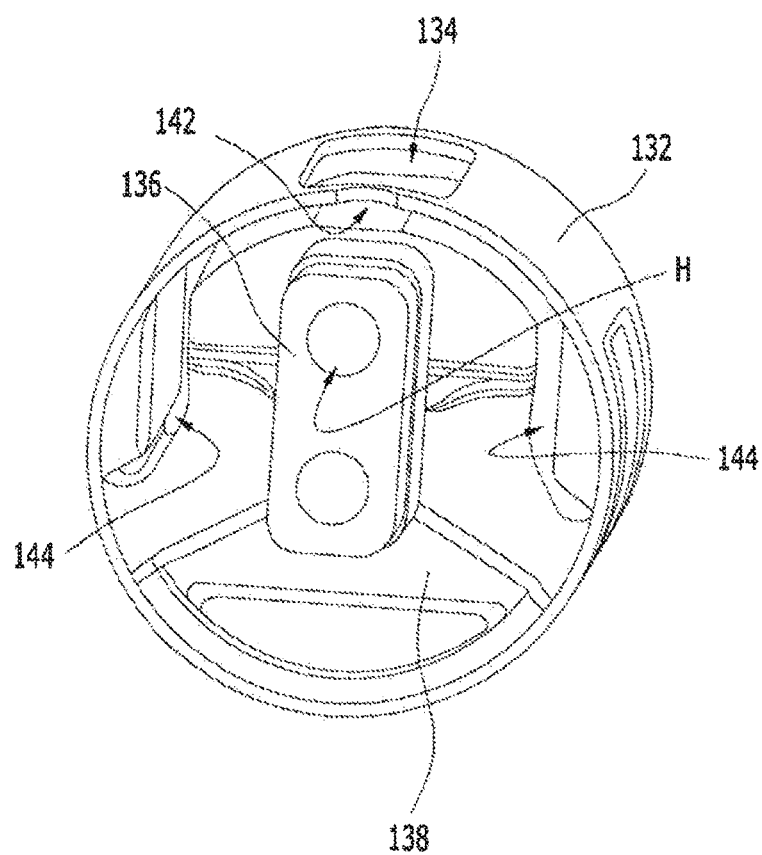
FIG. 4 is a view illustrating a state in which a second insulator is mounted in a second outer pipe and an inner core applied to the bush unit of FIG. 2.

As shown in FIG. 4, the second outer pipe 132 is in the form of a cylinder having a smaller external diameter than that of the first outer pipe 122 and is inserted into the first outer pipe 122 with the first insulator 126 interposed, The second through hole 134 may be integrally formed on the second outer pipe 132 to correspond to the first through hole 124. The inner core 136 is disposed in a center of the second outer pipe 132, and a bolt hole H is formed in a center of the inner core 136 to be mounted in the transmission.

In a state where the second insulator 138 surrounds an external circumference of the inner core 136 disposed in the center of the second outer pipe 132, an external circumference of the second insulator 138 is bonded to an internal circumference of the second outer pipe 132. In particular, a gap 142 of a predetermined distance is formed between a top of the second insulator 138 corresponding to the first through hole 124 and the internal circumference of the second outer pipe 132. Operation holes 144 are penetratingly formed on both sides of the second insulator 138 around the inner core 136 to be connected to the gap 142. When an external force input during a vibration and driving of the transmission is operated, the operation holes 144 induce a transformation of the second insulator 138 so that the second insulator 138 may absorb the vibration and external force.

On the other hand, when the bush unit 120 is inserted into the mounting unit 112 of the mounting bracket 110, the stopper 128 is inserted into the gap 142 while contacting an internal circumference of the mounting unit 112 and passing through the first through hole 124 of the first outer pipe 122 and the second through hole 134 of the second outer pipe 132.

Figure 5:
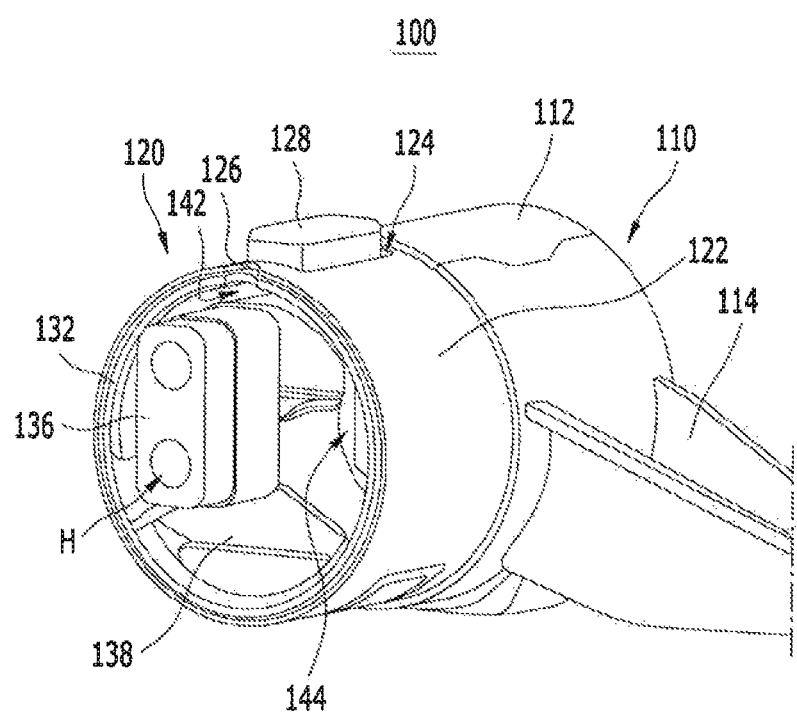
FIG. 5 is a view illustrating a combination of a mounting bracket and a bush unit in the transmission mounting unit of FIG. 1.

As illustrated in FIG. 5, the stopper 128 may be square block-shaped and edges of a top surface of the stopper 128 are rounded or inclined. Meanwhile, the stopper 128 is formed by square block-shape in FIG. 5. However, the stopper 128 is not limited thereto, and can be varied and applied by a person of ordinary skill in the art by forming like oval-shape and so on. Therefore, when the stopper 128 is inserted into and contacts the mounting unit 112 while being protruded to the first outer pipe 122, friction is minimized and the stopper 128 is pushed by the mounting unit 112.

The stopper 128 pushed by the mounting unit 112 is moved downward toward the inner core 136 through the first and second through holes 124 and 134 to be positioned in the gap 142. Here, before being connected to the transmission so that a load of the transmission is not applied to the bush unit 120 of the transmission mounting unit 100, the stopper 128 remains to contact a top of the inner core 136 surrounded by the second insulator 138.

In such a state, when the transmission is completely mounted in the transmission mounting unit 100, the inner core 136 is moved downward by the load of the transmission to press a bottom of the second insulator 138 so that a distance of about 3 to 4 mm is maintained between the stopper 128 and the top of the inner core 136 surrounded by the second insulator 138.

Therefore, when the second insulator 138 is transformed by shock caused by a vibration generated by the transmission and an external force input during driving of a vehicle, in the transmission mounting unit 100 according to the present exemplary embodiment, the top of the inner core 136 surrounded by the second insulator 138 frequently contacts the stopper 128 so that it is possible to prevent the second insulator 138 from being remarkably transformed, to smoothly absorb the vibration and shock, and to prevent the transmission from being vibrated. That is, the stopper 128 smoothly attenuates the vibration and shock together with the second insulator 138 and prevents the second insulator 138 from being remarkably transformed so that durability is improved and a ride comfort and NVH performance are improved.

In addition, the stopper mounted by an adhesive in a conventional art is integrally formed in the first insulator 126 bonded to an internal circumference of the first outer pipe 122 so that a space for bonding the stopper is not required, and it is possible to prevent a size of the transmission mounting unit from being unnecessarily increased, to remove an additional stopper bonding process, and to simplify processes.

Therefore, when the above-described vehicle transmission mounting unit 100 according to the exemplary embodiment of the present invention is applied, the vehicle body and the transmission are connected by the double outer pipes 122 and 132 and the integral stopper 128 so that the large amplitude vibration generated by the transmission is efficiently controlled. Therefore, it is possible to improve durability and a ride comfort and to improve a commercial value.

In addition, the stopper 128 is integrally formed in the first insulator 126 to be bonded to the internal circumference of the first outer pipe 122 so that the bonding process required when the additional stopper is mounted in the conventional art is removed and processes may be simplified. Therefore, it is possible to reduce cost, an assembly performance, and productivity.

In addition, the integral stopper 128 is applied so that it is possible to prevent the stopper 128 from being separated from the second insulator 138 by a vibration continuously generated when a vehicle is driven. Therefore, it is possible to improve NVH performance and durability of a vehicle and to increase a VDS index of a vehicle.

On the other hand, in describing the vehicle transmission mounting unit 100 according to the exemplary embodiment of the present invention, in the present exemplary embodiment, the stopper 128 of the first insulator 126 is protruded to the first through hole 124 of the first outer pipe 122. However, the present invention is not limited to the above. When the first outer pipe 122 and the second outer pipe 132 are combined with each other in a state where the stopper 128 is integrally formed not in the first insulator 126 but in the second insulator 138 to protrude through the second through hole 134, the stopper 128 may be formed to protrude from the second through hole 134 through the first through hole 124.

That is, according to another exemplary embodiment of e present invention, the first and second outer pipes 122 and 132 are provided, and the stopper may be integrally formed, not in the first insulator 126, but in the second insulator 138.

In addition, according to the present exemplary embodiment, the first outer pipe 122 and the second outer pipe 132 are separately provided to be combined with each other. However, the present invention is not limited to the above and only the second outer pipe 132 may be provided without the first outer pipe 122 disposed outside to be inserted into the mounting unit 112 of the mounting bracket 110.

In this case, the stopper 128 may have an internal circumference bonded while surrounding the external circumference of the inner core 136 between the second outer pipe 132 and the inner core 136 and may have an external circumference integrally formed in the second insulator 138 bonded to the internal circumference of the second outer pipe 132 to protrude to the second through hole 134 formed in the second outer pipe 132.

As described above, only one outer pipe is provided when utilizing a rubber type bush unit to which only the insulators are applied, and the double outer pipes are provided when utilizing a hydro type bush unit in which an operation fluid is filled. The rubber type bush unit and the hydro type bush unit may be selectively applied in accordance with a vehicle model and requirement to insulate a vibration.

In particular, the hydro type bush unit in which a non-illustrated operation fluid is filled is applied to the vehicle transmission mounting unit 100 according to the exemplary embodiment of the present invention. However, the present invention is not limited to the above, and the rubber type bush unit formed of the second insulator 138 including the second outer pipe 132, the inner core 136, and the stopper 128 without the first outer pipe 122 and the first insulator 126 may be applied.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle transmission mounting unit, comprising:
a mounting bracket formed with a cylindrical mounting unit in a center of the mounting bracket, and having mounting ends fixed to a vehicle body integrally formed on both sides of the mounting unit of the mounting bracket; and
a bush unit inserted into the mounting unit of the mounting bracket,
wherein the bush unit comprises:
a first outer pipe that forms an outer shell to be inserted into the mounting unit of the mounting bracket, the first outer pipe having a first through hole on top of the first outer pipe;
a first insulator bonded to an internal circumference of the first outer pipe and integrated with a stopper protruding from the first through hole to an outside of the first outer pipe;
a second outer pipe inserted into the first outer pipe with the first insulator interposed;
an inner core disposed in a center of the second outer pipe; and
a second insulator having an external circumference bonded to an internal circumference of the second outer pipe while surrounding an external circumference of the inner core and having a gap corresponding to the first through hole and separated from the internal circumference of the second outer pipe by a predetermined distance.

2. The transmission mounting unit for a vehicle of claim 1, wherein a second through hole is integrally formed on top of the second outer pipe to correspond to the first through hole.

3. The transmission mounting unit for a vehicle of claim 2, wherein the stopper is inserted into the gap through the first through hole of the first outer pipe and the second through hole of the second outer pipe while contacting an internal circumference of the mounting unit of the mounting bracket when the bush unit is inserted into the mounting unit of the mounting bracket.

4. The transmission mounting unit for a vehicle of claim 1, wherein the stopper is formed so that edges of a top surface are rounded.

5. The transmission mounting unit for a vehicle of claim 1, wherein the second insulator has operation holes penetratingly formed on both sides around the inner core and is connected to the gap.

6. A vehicle transmission mounting unit, comprising:
a mounting bracket formed with a cylindrical mounting unit in a center of the mounting bracket, and having mounting ends fixed to a vehicle body integrally formed on both sides of the mounting unit of the mounting bracket; and
a bush unit inserted into the mounting unit of the mounting bracket,
wherein the bush unit comprises:
an outer pipe that forms an outer shell to be inserted into the mounting unit of the mounting bracket and having a through hole formed on top of the outer pipe;
an inner core disposed in a center of the outer pipe;
an insulator having an external circumference bonded to an internal circumference of the outer pipe while surrounding an external circumference of the inner core, and having a gap corresponding to the through hole and separated from the internal circumference of the outer pipe by a predetermined distance; and
a stopper integrally formed with the insulator, and protruded to an outside of the outer pipe through the through hole,
wherein the stopper is inserted into the gap through the through hole of the outer pipe while contacting an internal circumference of the mounting unit of the mounting bracket when the bush unit is inserted into the mounting unit of the mounting bracket.

7. The transmission mounting unit for a vehicle of claim 6, wherein the stopper is formed so that edges of a top surface are rounded.

8. A vehicle, comprising:
a transmission mounting unit, comprising:
a mounting bracket having a mounting unit centered in the mounting bracket; and
a bush unit inserted into the mounting bracket, the bush unit comprising:
an outer pipe that forms an outer shell to be inserted into the mounting unit of the mounting bracket and having a through hole formed on top of the outer pipe;
an inner core disposed in a center of the outer pipe;
an insulator having an external circumference bonded to an internal circumference of the outer pipe while surrounding an external circumference of the inner core and having a gap separated from the internal circumference of the outer pipe by a predetermined distance; and
a stopper integrally formed with the insulator, and protruded to an outside of the outer pipe through the through hole,
wherein the stopper is inserted into the gap through the through hole of the outer pipe while contacting an internal circumference of the mounting unit of the mounting bracket when the bush unit is inserted into the mounting unit of the mounting bracket.

9. The vehicle of claim 8, wherein the stopper is formed so that edges of a top surface are rounded.

* * * * *